Nov. 13, 1962      E. V. McMARTIN      3,063,605
DRAPERY MEASURING DEVICE AND METHOD FOR USING SAME
Filed July 8, 1960
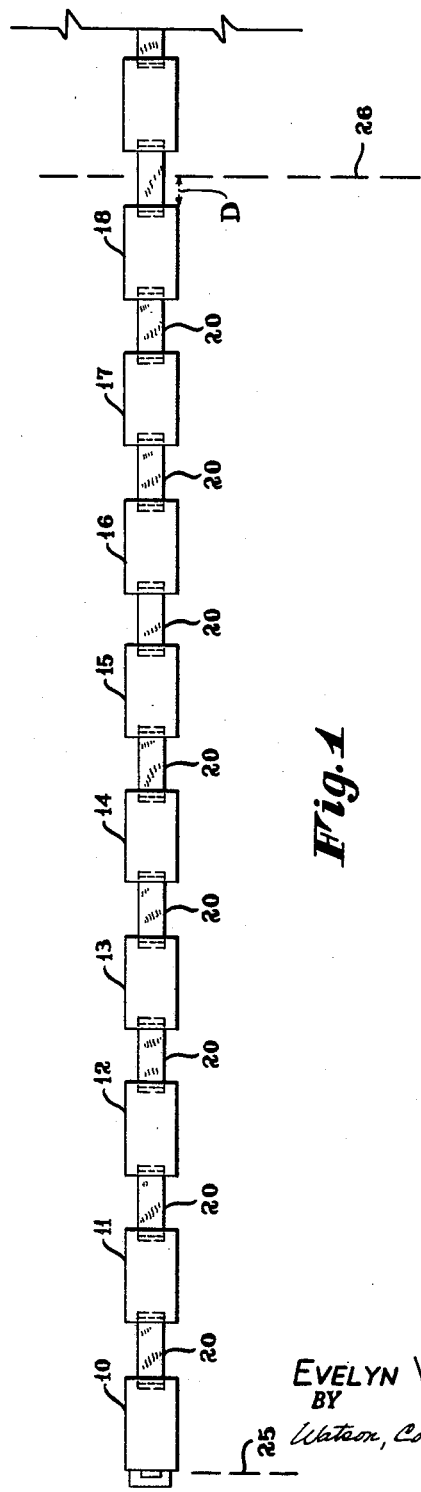
INVENTOR.
EVELYN V. McMARTIN
BY
Watson, Cole, Grindle & Watson
ATTORNEYS United States Patent Office 3,063,605
Patented Nov. 13, 1962

3,063,605
DRAPERY MEASURING DEVICE AND
METHOD FOR USING SAME
Evelyn V. McMartin, 87 Bunn St., Amsterdam, N.Y.
Filed July 8, 1960, Ser. No. 41,653
9 Claims. (Cl. 223—34)

This invention relates to a drapery measuring device and method for using same.

Priorly, numerous devices and methods have been employed to determine required width and the location and size of pleats on draperies. For example, it is known to employ as a measuring device in drapery, a tape which is sewn to the drapery material, which tape has spaced holes transversely of the tape to employ drapery hooks having a number of adjacent forks on a single hook and to invert these several forks into the spaced holes in the tape. Thus, the hook forces a pleat into the drapery. This system has certain disadvantages, for example, the tape and the hooks are expensive. The system provides no method for determining the width of material required nor does it provide for varying the size of the pleats.

Still another known method of measuring draperies is to use the standard measuring tape to measure the area to be covered, estimate the number of pleats desired, add the dimensions of the number of pleats to the drapery material required to cover the space, and employ a standard measuring tape to measure the drapery material and to locate the various pleats. This, of course, is rather difficult for the unskilled workman and leads to numerous errors such as the location of a pleat at the end of a drape, the improper spacing of the pleats, or failing to provide sufficient material adequately to cover the desired area.

Accordingly, it is an object of this invention to provide an improved method and device for measuring drapery.

It is another object of this invention to provide an improved method and device for measuring drapery which is more economical, but which facilitates the measurement and location of the pleats in the drapery to a degree greater than that possible with prior methods and devices.

It is another object of this invention to provide a simple drapery measuring device which can be used by an unskilled workman to achieve a high degree of uniformity in the location and size of the pleats, and to determine the number of widths required in each drapery panel.

It is another object of this invention to provide a simple method for measuring drapery material, accurately to locate the pleats, and to determine the size of the pleats.

Briefly, in accordance with aspects of this invention, the drapery measuring device is designed to measure spaces and pleats in draperies for any window size. Since the homes have a variety of different windows, it is necessary to provide a device which is flexible as to drapery width and provides for pleats and pleat location regardless of the width of the window to be covered. In accordance with other aspects of this invention, the measuring device is comprised of a plurality of rigid rectangular members, joined in a chain by relatively wide elastic bands. The rectangular members may be in the form of paper or plastic cards or other suitable material which is not extensible, and these cards are employed to locate the areas between the pleats. The elastic members are employed to locate the pleats. This measuring device permits the measurement and exact determination of pleats and spaces regardless of window width and regardless of the number of widths employed in the drapery panel. The drapery material is usually sold in the form of standard widths, such as 36, 45 and 48 inches. In fabricating a wide drape, it is often necessary to sew a number of these widths together to form a drapery panel to provide the desired coverage. In view of the wide variety of window sizes, it is difficult for an unskilled person to make an accurate determination of the size of the pleats, although it is essential that the size of the pleats and the areas between the pleats be uniform.

In accordance with aspects of this invention, if the measuring device does not coincide with the width of a single panel, then one end of the measuring device is anchored, preferably to one end of a table and to one end of the panel while the next adjacent card nearest the other end of the panel is pulled until the elastic material extends sufficiently to permit the edge of the card to be aligned with the other edge of the panel. The elastic material between each of the cards will elongate uniformly and thus the size of the pleats will be uniform throughout the errors such as the location of a pleat at the end of a panel. Since the cards do not extend, or are not extensible, these cards will indicate a uniform spacing between the pleats. Marks are then made on the material to indicate the edges of the cards, and thus the edges of the pleats. Adjacent pairs of marks, i.e., marks of the adjacent edges of the cards, are sewn together, taking tucks in the drapery material between the marks as desired to produce the necessary pleat size. It is understood that the same number of tucks will be taken at each pleat.

These and various other objects and features of the invention will be more clearly understood from a reading of the detailed description of the invention in connection with the drawing which depicts one illustrative embodiment of this invention.

Referring now to the drawing, there is depicted a number of rectangular card-like members 10 through 18. These rectangular members may be comprised of cardboard or plastic or any other convenient material, and these rectangles are connected together by elastic members 20. If the rectangular members 10 through 18 are formed of cardboard or plastic material, the elastic material 20 may be sewn or attached in any other convenient manner to the edges of the rectangular members. In using the drapery measuring device depicted in the drawing, the left-hand card 10 will be designated as the "master card" and is to be attached to the left-hand edge of the inside of the panel, while the card inside but next adjacent the other end of the panel will be designated as the "key card." As mentioned earlier, the cards determine the areas between the pleats. Accordingly, these cards may be of the lengths corresponding to the area desired between pleats. In this illustrative embodiment, the elastic members 20 are each approximately three-fourths as long as one card. For example, the cards may be 4 inches long and the elastic may be 3 inches long. The elastic members in this embodiment may elongate under tension to a length approximately one and one-fourth times as long as one card.

In utilizing this drapery measuring device, the width of the window is first measured by measuring with a standard measuring tape to determine the space to be covered. Generally, the window frame is covered and is, therefore, included in the measurement. If it is desired to have additional wall space covered by drapery, the measurement is made in the same way to determine the total width to be covered. The next step is to refer to the table below where the particular window measurement is listed in the left-hand column.

Table

| Window Measurement to be covered by single panel in inches | Width of Material, Inches | Widths Required | Finished Width of Single Panel Without Pleats, Inches |
|---|---|---|---|
| 18 to 25 | 36 / 45 / 48 | 2 / 2 / 2 | 32 |
| 26 to 33 | 36 / 45 / 48 | 2 / 2 / 2 | 40 |
| 34 to 41 | 36 / 45 / 48 | 3 / 2 / 2 | 48 |
| 42 to 49 | 36 / 45 / 48 | 3 / 3 / 3 | 56 |
| 50 to 57 | 36 / 45 / 48 | 4 / 3 / 3 | 64 |
| 58 to 65 | 36 / 45 / 48 | 4 / 4 / 3 | 72 |
| 66 to 73 | 36 / 45 / 48 | 4 / 4 / 3 | 80 |
| 74 to 81 | 36 / 45 / 48 | 5 / 4 / 4 | 88 |
| 82 to 89 | 36 / 45 / 48 | 5 / 5 / 4 | 96 |
| 90 to 97 [1] | 36 / 45 / 48 | 6 / 5 / 4 | 104 |
| 98 to 105 [1] | 36 / 45 / 48 | 6 / 5 / 5 | 112 |
| 106 to 113 [2] | 36 / 45 / 48 | 7 / 6 / 5 | 120 |
| 114 to 121 [1] | 36 / 45 / 48 | 7 / 6 / 5 | 128 |
| 122 to 129 [2] | 36 / 45 / 48 | 8 / 6 / 6 | 136 |
| 130 to 137 [1] | 36 / 45 / 48 | 8 / 7 / 6 | 144 |
| 138 to 145 [2] | 36 / 45 / 48 | 9 / 7 / 6 | 152 |
| 146 to 153 [1] | 36 / 45 / 48 | 9 / 7 / 7 | 160 |
| 154 to 161 [2] | 36 / 45 / 48 | 9 / 8 / 7 | 168 |
| 162 to 169 [1] | 36 / 45 / 48 | 10 / 8 / 7 | 176 |
| 170 to 177 [2] | 36 / 45 / 48 | 10 / 8 / 8 | 184 |

NOTE:
[1] Fold panel in half and use center line of elastic at left of key card as right-hand end of measuring device (forms pleat at the center of panel).
[2] Fold panel in half and use dot at center of key card as right-hand end of measuring device (forms space at center of panel).

The first item in the table corresponds to window measurement between 18 and 25 inches. If the width of material to be employed as a panel is 36 inches, two widths will be required and the ultimate finished drape width will be 32 inches. By this is meant that when the widths are sewn together and are hemmed around the edges, the panel should measure 32 inches in width without pleats. It is, of course, understood that the material selected governs the number of widths that are required to cover the area and, as mentioned above, a panel may be composed of a number of widths. It is understood that there will be two panels for each window, one for each side of the window, each drape being composed of one or more widths. When the widths required for a single panel are sewn together and hemmed, the seams where the widths are sewn together and the seams at the edge are formed so that the ultimate panel width corresponds to the dimension in the right-hand column of the table opposite the range of window measurement to be covered by a single panel. After the widths are sewn together, a crinoline or stiffening material is preferably inserted or sewn into the hem at the top of the panel so that the pleat will be firm when sewn into the material and the material between the pleats will not wrinkle.

The panel is now ready to measure for pleats with the measuring device. If the extended or elongated length of the measuring device is longer than the width of the panel, the following steps are taken. The panel is placed on a table and the ends of the top hem of the panel secured to the table. The left-hand edge of the plastic card 10, which is designated as the "master card," is secured to the left-hand edge of the panel and will thus correspond to the dotted line 25 in the drawing. The key card of the group 11 through 18, which is to the left of the right-hand edge 26 and the nearest edge 26, is pulled until the right-hand edge of the key card is even with the right-hand edge 26 of the panel. In this particular example, the closest right-hand edge of the key card is that of card 18 and this card is pulled the distance marked D so that the right-hand edge of key card 18 coincides with the right-hand edge 26 of the panel. The elastic material 20 between each of the key cards will be uniformly elongated throughout the measuring device. Thus, the distance D will be uniformly distributed between each of the eight pieces of elastic material. The drapery or panel is now marked at each of the edges of the cards. The two marks at adjacent edges of the cards are designated as a pair. The measuring device is now removed and the adjacent pairs of marks are sewn together to define one pleat for each pair of marks. It is, of course, understood that a number of tucks may be made at each of the pleats, the number, of course, being uniform throughout the panel and thus the size of the tucks will be uniform. The panel is now complete and ready for hanging on the drapery rod. In order to hang the pnaels on the drapery rod, conventional S-type drapery hooks may be employed. The result is a highly uniform drapery which is easy to fabricate and economical to make.

This device may be employed for fabricating pleated drapes regardless of size. It is not necessary that the measuring device, when elongated, be as long as the width of the finished panel. For example, assume for a moment that the desired panel width is longer than the measuring device and it is desired to have a pleat at the center of each panel. The upper edge of the panel is then folded with its inside out to make the edges meet the measuring device employed to measure one-half of the width of the panel. In this instance, the master card is secured to the left-hand edge of the folded panel. The nearest key card to the center of the panel or the fold is pulled until the center line 21 of the nearest elastic member to the left of the fold is coincident wtih the fold of the panel. The measuring device is now anchored and the drapery material is marked at each of the edges of the cards. The marks between adjacent cards are defined as a pair and the pairs of marks are then sewn together. An extra marked point will be produced at the right-hand edge of the last key card. The panel is now turned over on the table and marked from the other or right-hand edge toward the center fold. A second extra mark will be produced adjacent the fold. These two extra marks constitute a pair and are also sewn together to define a pleat. The desired number of tucks are taken between the pairs of marks to produce the necessary number of folds in the pleat. The same steps are employed in the opposite side of the panel.

In the instance of a large panel in which the panel has been folded in half for the purpose of measuring, the previous paragraph explains a method by which an equal number of pleats will occur on each half of the panel and a pleat will occur at the center. If, however, it is desired to have an even number of pleats on the panel (and thus have a space at the center) the following steps are followed. After the panel has been folded in half with the inside out, the master card is anchored to the left-hand edge. The key card next adjacent the center fold is pulled until the center of this key card (which may be marked) is coincident with the right-hand, or folded, edge of the panel. The panel is marked at the edge of each card. Similar measuring and marking steps are employed on the opposite half of the panel. Each half of the panel now contains an even number of marks and these marks are sewn together in pairs as indicated previously.

It will be apparent that this device greatly facilitates the fabrication of pleated drapes by one unskilled in the art. It is to be noted that the measuring device is flexible. If it is desired to hide a seam in the middle of the drapery panel, the middle of the measuring device is moved to the left or to the right so that the seam will occur at a pleat. The left-hand card, previously designated as the master card, and the right-hand edge, the center line of the right-hand card next adjacent the left-hand edge of the panel, or the center line of nearest elastic member to the left of the edge of the panel may be secured to the corners of the panel to thus form spaces and pleats which will be uniform in size.

It is, of course, understood that the previous description has been made with reference to a single panel and that the previously described steps will be repeated for the other panel since normally two panels are employed for a single window.

While I have described and explained one illustrative embodiment of this invention, it will be understood that the features and concepts thereof may be employed in conjunction with other embodiments without departing from the spirit and scope of this invention.

What is claimed is:

1. A drapery measuring device comprising a chain including a plurality of members and a plurality of elastic means each connecting two of said members, said members being of equal length, said elastic means being of equal length in the absence of any tension, the length of said inelastic members defining the spacing between pleats to be formed on said drape whereby said elastic means indicates the size of the pleats in the drape when the device is placed under tension.

2. A drapery measuring device for locating pleats in a drapery panel, comprising a plurality of inelastic members of equal length, said length defining the distance between pleats and a plurality of elastic pleat measuring members each connecting two of said inelastic members, said elastic members being of equal length in the absence of tension, whereby the measuring device may be elongated and placed upon a drapery panel to coincide with the edge of the drapery material to be pleated and marks made upon the panel at the edges of the inelastic members, the marks at the edges of adjacent inelastic members defining pairs of marks, which panel is to be sewn together at said pairs of marks to define pleats.

3. A drapery measuring device according to claim 2, wherein said inelastic members are rectangular and wherein said elastic members are joined to similar edges of said inelastic members.

4. A method for measuring a drape to determine the location and size of the pleats and to determine the spacing between pleats, which method comprises the steps of placing the drapery material on a surface, employing as a measuring device a plurality of inelastic members of equal length connected together by elastic members, said elastic members being of equal length in the absence of any tension, securing one end of the measuring device to one edge of the drapery panel, applying tension to the measuring device, bringing the measuring device into contact with the panel, marking on the drape the position of the adjacent edges of said inelastic members to define pairs of marks, and sewing together the pairs of marks to form pleats.

5. The method according to claim 4, further including the step of taking a like plurality of tucks between adjacent pairs of marks.

6. A method for measuring a drape for pleats to determine the location and size of the pleats, comprising the steps of placing the drapery material on a surface, employing as a measuring device a plurality of inelastic members connected by a plurality of elastic members of equal length, connecting one end of the measuring device to one edge of the panel, applying tension to the measuring device until a predetermined point on the measuring device corresponds to the right-hand edge of the panel, marking pairs of marks on the panel, the marks indicating the location of adjacent edges of the inelastic members and sewing the pairs of marks together.

7. A method according to claim 6, further including the steps of taking an equal number of tucks between each of the tucks being of equal size.

8. The method according to claim 6 wherein said predetermined point is at the mid-point of one of the elastic members and wherein said panel is folded before the measuring device is employed.

9. The method according to claim 6 wherein said predetermined point is at the mid-point of one of the inelastic members and wherein said panel is folded before the measuring device is employed.

References Cited in the file of this patent

UNITED STATES PATENTS 2,777,617     Matt _____ Jan. 15, 1957

FOREIGN PATENTS 319,540     Italy _____ July 13, 1934